Figure 4:
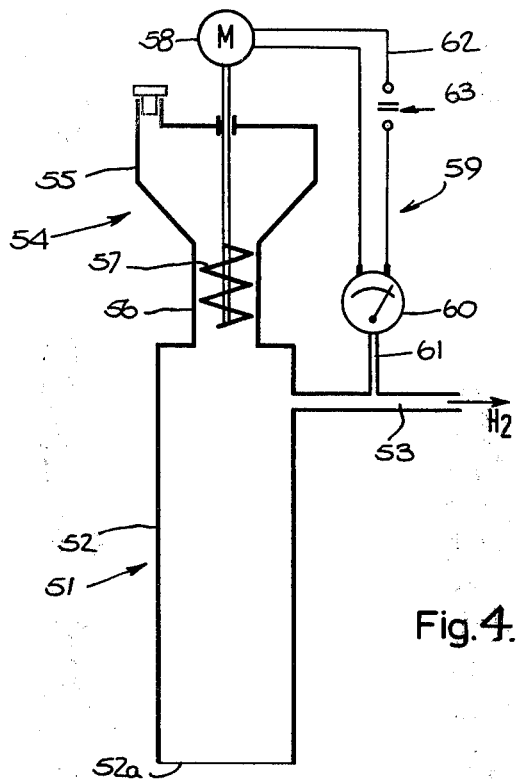

United States Patent [19]

Gutbier et al.

[11] 3,932,600

[45] Jan. 13, 1976

[54] PROCESS FOR THE GENERATION OF HYDROGEN

[75] Inventors: Heinrich Gutbier; Karl Höhne, both of Erlangen, Germany

[73] Assignee: Siemens Aktiengesellschaft, Munich, Germany

[22] Filed: Sept. 13, 1973

[21] Appl. No.: 397,009

[30] Foreign Application Priority Data

Sept. 13, 1972 Germany.............................. 2244944

[52] U.S. Cl. .................. 423/657; 423/648; 23/281; 252/182
[51] Int. Cl.² ....................... C01B 1/07; C01B 1/02
[58] Field of Search.............................. 423/657, 648

[56] References Cited
UNITED STATES PATENTS

| 1,059,818 | 4/1913 | Bergius ................................ 423/648 |
| 2,623,812 | 12/1952 | Eborall et al. ................... 423/657 X |
| 3,017,250 | 1/1962 | Watkins................................ 423/657 |
| 3,540,854 | 11/1970 | Brooke, Jr. et al. ............. 423/657 X |
| 3,703,358 | 11/1972 | Carson, Jr. et al. ................. 423/657 |

Primary Examiner—Edward Stern
Attorney, Agent, or Firm—Kenyon & Kenyon Reilly Carr & Chapin

[57] ABSTRACT

This patent relates to a method for the generation of hydrogen, particularly for fuel cells, as well as apparatus for practicing the method. According to the invention, particles of magnesium are reacted with water in the presence of at least one cobalt oxide and at least one water-soluble chloride. Aluminum may advantageously be included with the magnesium. This abstract is neither intended to define the invention covered by this application, which, of course, is measured by the claims, nor is it intended to be limiting as to the scope of the invention in anyway.

9 Claims, 4 Drawing Figures

PROCESS FOR THE GENERATION OF HYDROGEN

This invention relates to a method for the generation of hydrogen, particularly for fuel cells, through reaction of metals with water, as well as apparatus for practicing the method.

In fuel cells, current is generated by an electrochemical reaction between a fuel and an oxidant. A particularly high level of technical development has been reached by hydrogen/oxygen fuel cells, i.e., systems in which hydrogen is used as the fuel and oxygen or air as the oxidant. The anodically consumed hydrogen may be supplied from various sources: pure hydrogen from pressure bottles or cryogenic tanks; hydrogen generated through catalytic decomposition of hydrocarbon-containing compounds (reforming) as well as hydrogen generated by the decomposition of hydrazine or amonia; or hydrogen generated through the decomposition of hydrides or boranates with water or the reaction of metals with water.

Hydrogen generated by the reaction of metals with water is being considered particularly for hydrogen/oxygen fuel cells for unattended operation [see "Chemie-Ingenieur-Technik," Vol. 41, pp. 146 to 154 (1969)]. For reasons of reactivity and economy, magnesium, zinc and aluminum are the metals primarily considered. Such metals, however, react with water to produce hydrogen only to a negligible extent. This is because of the well-known fact that the metal hydroxide formed in the initial reaction with water forms a protective layer on the surface of the metal, which prevents further reaction with water, and thus the generation of hydrogen terminates immediately after the start. In order that such metals may be used for the generation of hydrogen to a greater extent, they are activated by amalgamating (formation of a metal-mercury alloy); amalgamated magnesium or aluminum, for instance, reacts vigorously with water even at room temperature, generating hydrogen. Alternatively, acids or bases (such as hydrochloric acid or potassium hydroxide) are used instead of water for the decomposition of the metals; this results in the continuous generation of hydrogen, because in the acid medium (in the case of Mg, Zn and Al) or in the alkaline medium (in the case of Zn and Al), the above-mentioned protective layer of hydroxide cannot develop.

The two possibilities mentioned, i.e., amalgamation or the use of acids or bases, however, are accompanied by various disadvantages. The consumption of mercury or of considerable quantities of alkaline or acid solution results in an increase in the cost of the hydrogen to be produced. Furthermore, the use of mercury may be particularly objectionable in view of its toxicity. The use of acid or alkaline solutions is disadvantageous from a process-technology point of view.

It is an object of the invention to provide a simplified and improved method for the generation of hydrogen through reaction of metals with water, particularly for the generation of hydrogen for fuel cells, which avoids the difficulties and disadvantages occurring with the methods employed heretofore.

It is a further object to provide novel apparatus for practicing the process.

Figure 1:
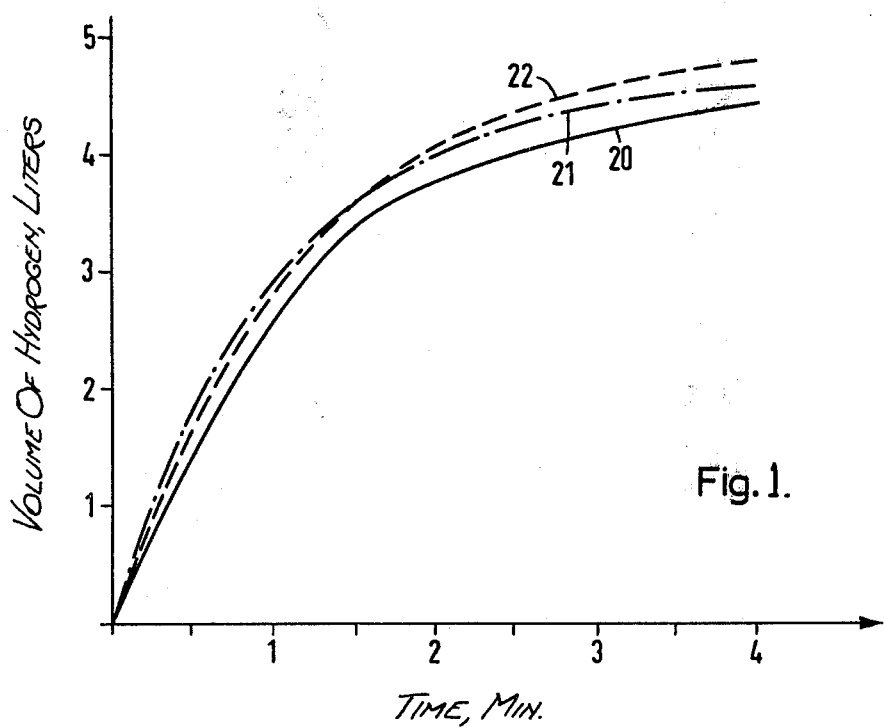
Figure 2:
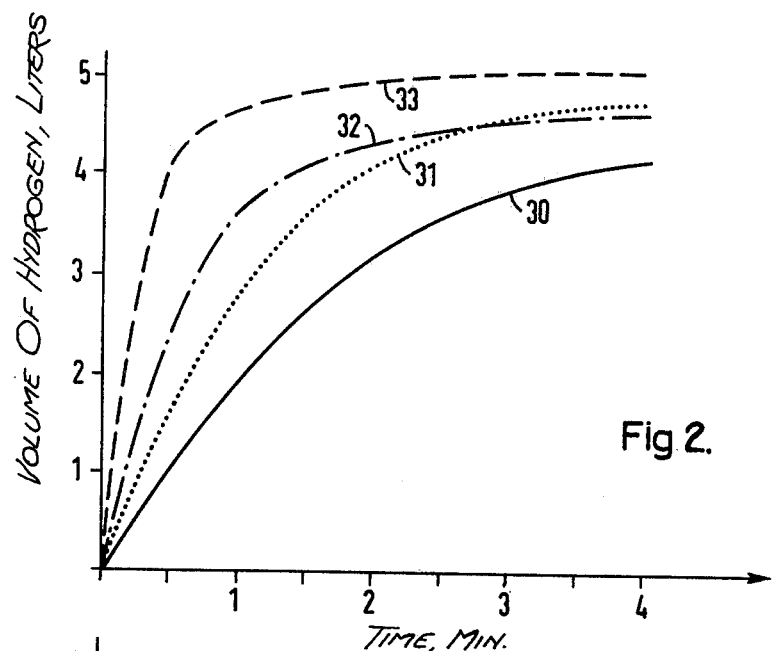
Figure 3:
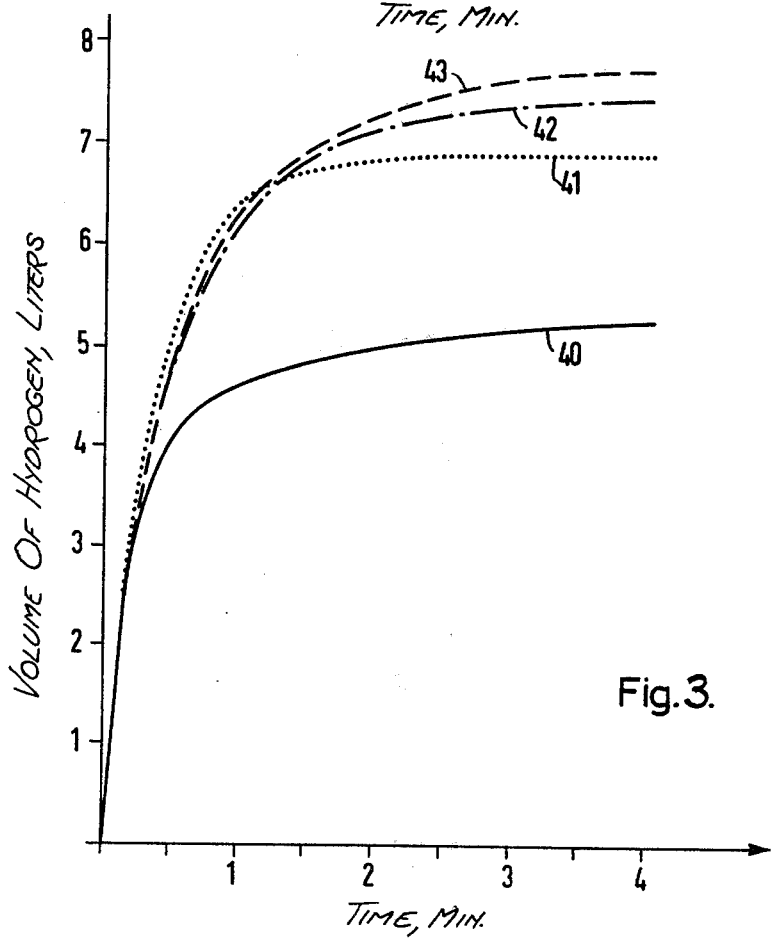

These and other objects will become apparent to those skilled in the art during the following description, including reference to the drawings, in which:

FIG. 1 presents data regarding the effect on the rate and amount of hydrogen generated at various concentrations of cobalt oxide;

FIG. 2 similarly presents data regarding the effect of various concentrations of a water-soluble chloride;

FIG. 3 similarly presents data regarding the effect of various ratios of aluminum to magnesium; and FIG. 4 illustrates schematically one embodiment of apparatus for practicing the process.

Broadly stated, the process for generating hydrogen comprises reacting with water particles of magnesium metal or a combination of magnesium and aluminum metal, such particles being admixed with particles of an oxide of cobalt, and the reaction which generates the hydrogen occurring in the presence of a water-soluble chloride.

In a more specific embodiment, the process comprises generating hydrogen by introducing into sea water a previously comminuted admixture of cobalt oxide, preferably tricobalt tetraoxide ($Co_3O_4$), and metallic magnesium and aluminum in a weight ratio in the range of between about 7:1 and 2:6, advantageously in the ratio between about 5:3 and 3:5. The amount of cobalt oxide comprises in the range of between about 0.5 and about 5 weight percent of the metal, advantageously about 0.5–1 weight percent. As an alternative to employing sea water, fresh water may be employed and a water-soluble chloride, advantageously sodium chloride, is admixed with the above-mentioned mixture of cobalt oxide and metal.

In the method according to the invention, any or a mixture of cobaltous oxide (CoO), cobaltic oxide ($Co_2O_3$) and tricobalt tetraoxide ($Co_3O_4$) may be employed. Particularly good results are obtained with $Co_2O_3$ and $Co_3O_4$, and especially with $Co_3O_4$.

Magnesium reacts with water, for instance, in the presence of $Co_3O_4$ and a water-soluble chloride with rapid, almost violent, generation of hydrogen.

The water-soluble chloride is preferably sodium chloride; other suitable chlorides are, for instance, potassium chloride and magnesium chloride.

In one embodiment of the invention, the cobalt oxide and water-soluble chloride are admixed with magnesium in granular form and the mixture is placed in water. In another embodiment, the chloride may be first dissolved in the water, and a magnesium-cobalt oxide admixture then introduced into this aqueous solution. Sea water may be advantageously employed as the aqueous chloride solution in this embodiment. Sea water contains about 3.5% of salts, predominantly in the form of chlorides; the sodium chloride content is about 2.7% by weight. The use of sea water is particularly advantageous in marine applications of fuel cells, for instance, in submerged craft as well as for the power supply of underwater stations, or for use in unattended fuel cells in buoys.

According to a particularly preferred embodiment of the invention, aluminum may be added to the magnesium, either as particles of aluminum, or particles of an alloy of magnesium and aluminum. Magnesium and aluminum are preferably employed in a weight ratio in the range of between about 7:1 and about 2:6. Particularly good results can be obtained if a Mg:Al weight ratio in the range of about 5:3 to about 3:5 is employed. Aluminum per se has an advantage over magnesium because it develops a larger amount of hydrogen per unit of weight; 1 mol of Al (27 g) yields theoretically 33.6 liters of hydrogen, whereas 1 mol of magnesium (24 g) yields only 22.4 liters, under standard temperature and pressure conditions.

The metal should be in small particle form, preferably granular or powdered, but may be in the shape of chips, turnings, or other irregularly shaped forms.

As noted above, the amount of cobalt oxide employed may be in the range of between about 0.5 and about 5% by weight of the total metal, magnesium and aluminum, advantageously about 0.5–1%. Employing a larger amount of cobalt oxide produces no substantial improvement.

The amount of chloride used is preferably in the range between 5 and 200% by weight of the total metal. Employing greater amounts of chloride produces no commensurate improvement, particularly with respect to the speed of the reaction and the quantity of hydrogen developed.

The metal may advantageously be mixed with a filler, in order to prevent an agglomeration of the metal particles, and thereby to ensure complete and rapid hydrolysis of the metal. Inorganic salts, for instance, may be employed as fillers. If a mixture of metal, cobalt oxide and chloride is employed, which is reacted with water for the purpose of generating hydrogen, the chloride may also serve as the filler.

FIGS. 1, 2 and 3 illustrate the effect on the rate and amount of hydrogen developed of various concentrations of cobalt oxide, chloride and aluminum, all relative to the amount of magnesium or combined magnesium and aluminum. The data were obtained from experiments conducted in a closed reaction vessel at room temperature. In each instance, the amount in liters of gaseous hydrogen produced is plotted on the ordinate, and, on the abscissa, the time in minutes from the start of the reaction.

The curves of FIG. 1 were obtained employing 8 grams of a magnesium reacting with an aqueous solution of 1 gram of sodium chloride in 0.5 liter of water. Curves 20, 21 and 22 are based upon employing, respectively, 0.05, 0.3 and 0.15 grams of tricobalt tetraoxide ($Co_3O_4$), corresponding to 0.62, 3.75, and 1.87 weight percent of such tetraoxide based upon the amount of magnesium. Curve 20 illustrates that only a small amount of cobalt oxide is necessary to assure the generation of hydrogen. In the absence of the cobalt oxide, the generation of hydrogen is negligible; after thirty minutes of contact with the magnesium and the aqueous solution, only about 0.1 liter of hydrogen had been generated; in the presence of cobalt oxide, about 2.5 to 3 liters per minute of hydrogen is generated at the beginning of the reaction under the conditions and in the amounts described above. The amount of hydrogen generated was measured with a gas meter; the hydrogen pressure was about 11 $N/cm^2$. The yield of hydrogen was about 60 to 65% under the conditions described.

FIG. 2 illustrates the effect of the concentration of the chloride on the rate and amount of hydrogen generated. The data for FIG. 2 were obtained employing a mixture of 8 grams of magnesium and 0.3 grams of tricobalt tetraoxide ($Co_3O_4$), which was added to 0.5 liter of an aqueous sodium chloride solution. The data for curves 30, 31, 32 and 33 were obtained employing, respectively, 0.5, 1, 2 and 14 grams of sodium chloride, which amounts correspond to 6.25, 12.5, 25 and 175 weight percent of the magnesium employed. The curves of FIG. 2 illustrate that the rate of reaction as well as the yield of hydrogen generated increase with increasing chloride concentration. For a sodium chloride concentration of about 2.8% by weight of the water (curve 33), i.e., at about the same concentration as exists in sea water, the hydrogen yield is about 70% of the maximum theoretical yield. The initial rate of hydrogen generation was about 4.7 liters per minute. In the absence of chloride in the water or admixed with the magnesium metal, the amount of hydrogen generated is negligible, being about only 0.15 liter after thirty minutes of contact between the magnesium and the water.

The yield of hydrogen generated and the speed of the reaction may be further increased by admixing aluminum with the magnesium. FIG. 3 illustrates these effects at varying magnesium: aluminum ratios. In each experiment, a total of 8 grams of metal was employed, admixed with 0.3 grams of tricobalt tetraoxide. These ingredients were added to a solution of 14 grams of sodium chloride dissolved in 0.5 liter of water. The data for curve 40 were obtained employing pure magnesium without any aluminum. The data for curves 41, 42 and 43 were obtained employing mixtures having magnesium: aluminum weight ratios of about 5:3, 4:4 and 3:5, respectively, which is to say, mixtures in which the aluminum comprised 37.5, 50 and 62.5% by weight of the total metal. The addition of aluminum substantially increases the yield of hydrogen. Where the magnesium:aluminum weight ratio is 1:1, as in curve 42, the hydrogen yield is approximately 86% of theoretical in contrast to approximately 70% when magnesium alone is employed, as in curve 40. When mixture with a magnesium:aluminium weight ratio of 1:1 is employed, the rate of hydrogen generation is about 6.5 liters per minute at the start of the reaction. The use of aluminum admixed to magnesium has the additional advantage that a greater amount of hydrogen can be obtained per gram of metal employed. It should be noted that pure aluminum which is not admixed or alloyed with magnesium does not appreciably react with water even if cobalt oxide and a water-soluble chloride are present as herein described.

The yield of hydrogen generated can be further increased if the reaction is carried out at an elevated temperature. Thus, the hydrogen yield increases, for instance, from about 50% at room temperature to about 90% of theoretical when the temperature of the aqueous sodium chloride solution is about 80°C and the metal employed has a magnesium:aluminum weight ratio of about 1:7.

The precise chemical explanation of the phenomena underlying the discovery are not fully understood, but the following explanation is tentatively offered. The effect of cobalt oxide and chloride on the metal may each be of a different nature. The chloride ions probably have a catalytic effect such that they attack and perforate the metal hydroxide layer or coating which initially forms, or, alternatively, such ions prevent the development of such metal hydroxide layer, and under either alternative permit access of the water molecules to the surface of the metal. The catalytic action of the cobalt oxides may be explainable by the formation of localized electrochemical cells. The cobalt, which is more electropositive than magnesium or aluminum, is precipitated as metal on the surface of the magnesium granule or particle and, due to its lesser excess hydrogen voltage, favors the generation of hydrogen. Substantiation for this hypothesis resides in the fact that particularly good activation of the magnesium or combined magnesium aluminum metal is achieved when the cobalt oxide is intimately admixed with the metal, as, for instance, by grinding together a physical mixture of the cobalt oxide and metal. The addition of a cobalt salt to an existing mixture of magnesium or magnesium and aluminum particles in an aqueous solution of a water-soluble chloride is without effect, in the sense that hydrogen is not generated. As noted above, however, the water-soluble chloride may be added either to the metal cobalt oxide mixture or first separately dissolved in the water.

Broadly stated, apparatus adapted for generating hydrogen by the reaction of water and a metal which is suitable for practicing the invention comprises a reaction zone adapted to contain water or an aqueous solution; an outlet from such reaction zone adapted to permit the withdrawal therefrom of gaseous hydrogen; storage means adapted to contain a supply of small particles of metal admixed with comminuted cobalt oxide; and transfer means adapted to transfer such metal particles from the supply means into the reaction zone.

The reaction zone may advantageously comprise a cylindrical, essentially vertical tube open at its lower end and closed at its upper end. The storage means may be located near the upper end of such a tube and be connected thereto by means of a conduit or passageway in which is disposed conveyor means comprising a screw conveyor which is adapted to transport the particles of metal from the storage means into the tube comprising the reaction zone. Also, the apparatus may comprise pressure sensing means adapted to sense the pressure in the reaction zone or in the hydrogen outlet line, and control means adapted to actuate the transfer means, e.g., the conveyor means, in response to the sensing by the pressure sensing means of a pressure in the reaction zone below a predetermined minimum pressure. The pressure sensing means may suitably be a contact manometer, and the control means may comprise suitable electrical circuitry connected to a motor which drives the conveyor means referred to above.

Employing a vertical tube having an open bottom end as referred to above is particularly advantageous for marine use when sea water is employed as the aqueous chloride solution. In this embodiment, the sludge from the reaction, essentially hydroxides of magnesium or aluminum, is automatically removed from the reaction zone by descending into the sea under the force of gravity. Additionally, no particular apparatus need be provided for replenishing the aqueous chloride solution, or for including a water-soluble chloride in the mixture of cobalt oxide and metal particles, inasmuch as sea water will enter into the reaction zone, thus furnishing an inexhaustible supply of an aqueous chloride solution.

FIG. 4 depicts in schematic fashion an advantageous embodiment of the apparatus. Reaction zone 51 comprises vertical tube 52 having an open bottom end 52a. Tubing 53 is connected to reaction zone 51 near the upper end thereof and serves as a means to withdraw the product hydrogen from the zone.

Storage means 54 is located above the upper end of tube 52 and comprises supply container 55 which is connected to the upper end of tube 52 by means of passageway or conduit 56. Supply container 55 is adapted to receive a physical mixture of comminuted cobalt oxide and particles of magnesium or magnesium and aluminum, or alloys thereof.

The transfer means adapted to transfer the mixture from the supply means into the reaction zone 51 comprises a screw conveyor 57 located in passageway 56 and is driven by motor 58. Pressure sensing means 59 comprises a contact manometer 60 which is pneumatically connected by means of line 61 to hydrogen outlet tubing 53. The control means comprises in part an electrical circuit 62 having a battery 63. Circuit 62 electrically connects contact manometer 60 and motor 58. Contact manometer 60 and circuit 62 are designed in a manner whereby the circuit is closed, thereby actuating motor 58, in response to the sensing by manometer 60 of a hydrogen pressure less than a pre-determined minimum, and to open the circuit when the hydrogen pressure sensed by the manometer exceeds a pre-determined maximum pressure, thus stopping motor 58 and thereby terminating introduction of the cobalt oxide-metal mixture into the reaction zone 51.

When employing the apparatus, a mixture of cobalt oxide and metal particles is placed in supply container 55. Reaction zone 51 is partially filled with sea water by immersing it into the sea. When manometer 60 senses a pressure less than a pre-determined minimum pressure, circuit 62 is closed, actuating motor 58, which results in transferring the cobalt oxide-metal mixture into the reaction zone. When such mixture falls on to the surface of the water, a violent reaction occurs, generating hydrogen. Due to the small bubbles of hydrogen which are produced at the surface of the metal particles and some of which adhere thereto, the metal particles are temporarily suspended at the surface of the solution, and thereafter sink slowly. As the reaction between the metal and the solution continues, the metal is converted to its hydroxide, a flocculent sludge.

When an open-bottom tube is employed as the reaction vessel, as in FIG. 1, two factors influence the desirable length of the tube. First, the tube should be sufficiently long that the hydrogen generation reaction involving any specific particle of metal be completed by the time such particle sinks past the open end of the tube. The minimum linear vertical distance which must be provided to assure complete reaction of the individual metal particles depends upon the size of the particle, larger particles requiring a longer minimum distance, and may be readily determined for any specific combination of metals, and their particle sizes, by routine experimentation. The desired length of tube 52 must also take into account the maximum hydrogen pressure which may occur, since any pressure within the upper portion of tube 52 which is above atmospheric pressure will depress the upper surface of the liquid in tube 52 to a level below the surface of the surrounding sea. Because of the flammable and explosive characteristics of hydrogen-air mixtures, as well as from the standpoint of economy, it is important that no hydrogen be permitted to escape from the reaction zone by means of bubbling out from open end 52a.

As an alternative to locating supply container 55 directly above the reaction zone, it could be located laterally, and in this alternative passageway 56 would be horizontal or slightly inclined to the horizontal.

Having thus described the invention, what is claimed is:

1. A process for generating gaseous hydrogen comprising reacting with water, small particles of magnesium metal or of a combination of magnesium and aluminum metal in a weight ratio of magnesium to aluminum of between 7:1 to 2:6, said particles being admixed with an oxide of cobalt selected from the group consisting of tricobalt tetraoxide ($Co_3O_4$) and dicobalt trioxide ($Co_2O_3$), said reaction occuring in the presence of a water soluble chloride selected from the group consisting of alkali metal chlorides and magnesium chloride, wherein the amount of cobalt oxide is from about 0.5 to 5.0% by weight of total metal and the amount of water-soluble chloride is from about 5% to 200% by weight of total metal.

2. The process of claim 1 wherein said combination of magnesium and aluminum metal is in the form of an alloy.

3. The process according to claim 1, wherein particles of aluminum are admixed with particles of magnesium.

4. The process according to claim 1, wherein said Mg:Al weight ratio is in the range of between about 5:3 and about 3:5.

5. The method according to claim 1, wherein said oxide is tricobalt tetraoxide ($Co_3O_4$).

6. The process according to claim 1, wherein said water-soluble chloride is sodium chloride.

7. The process according to claim 1, wherein said water-soluble chloride is dissolved in said water before the particles of magnesium metal or combination of magnesium and aluminum metal are reacted with the water.

8. The process according to claim 7, wherein sea water is employed.

9. The process according to claim 1, wherein fillers are added to said particles of metal in order to prevent agglomeration of the metal particles.

* * * * *